Aug. 9, 1932.　　　　F. O. SNOW, JR　　　　1,870,969
TRACTOR
Filed Aug. 16, 1928　　　5 Sheets-Sheet 3
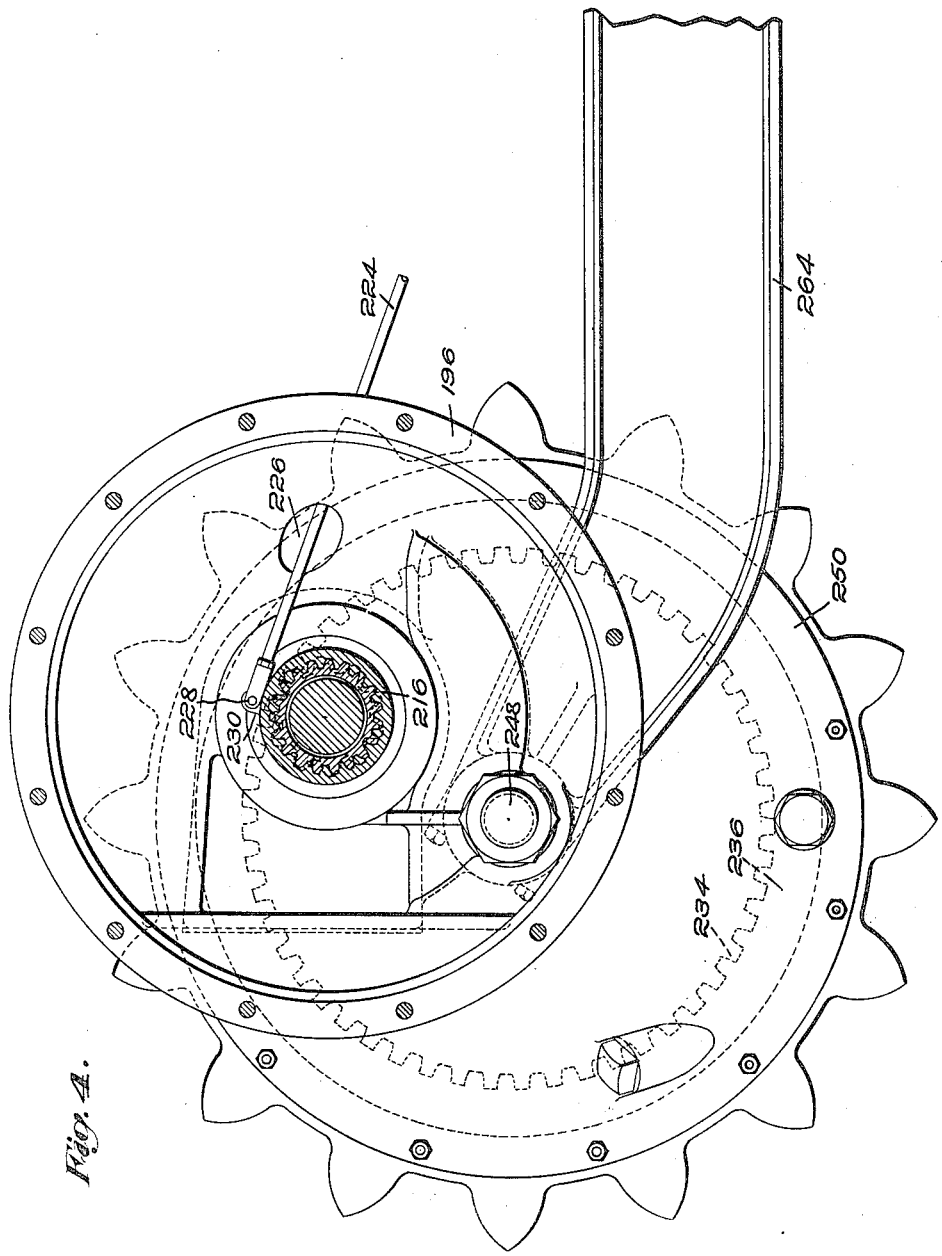

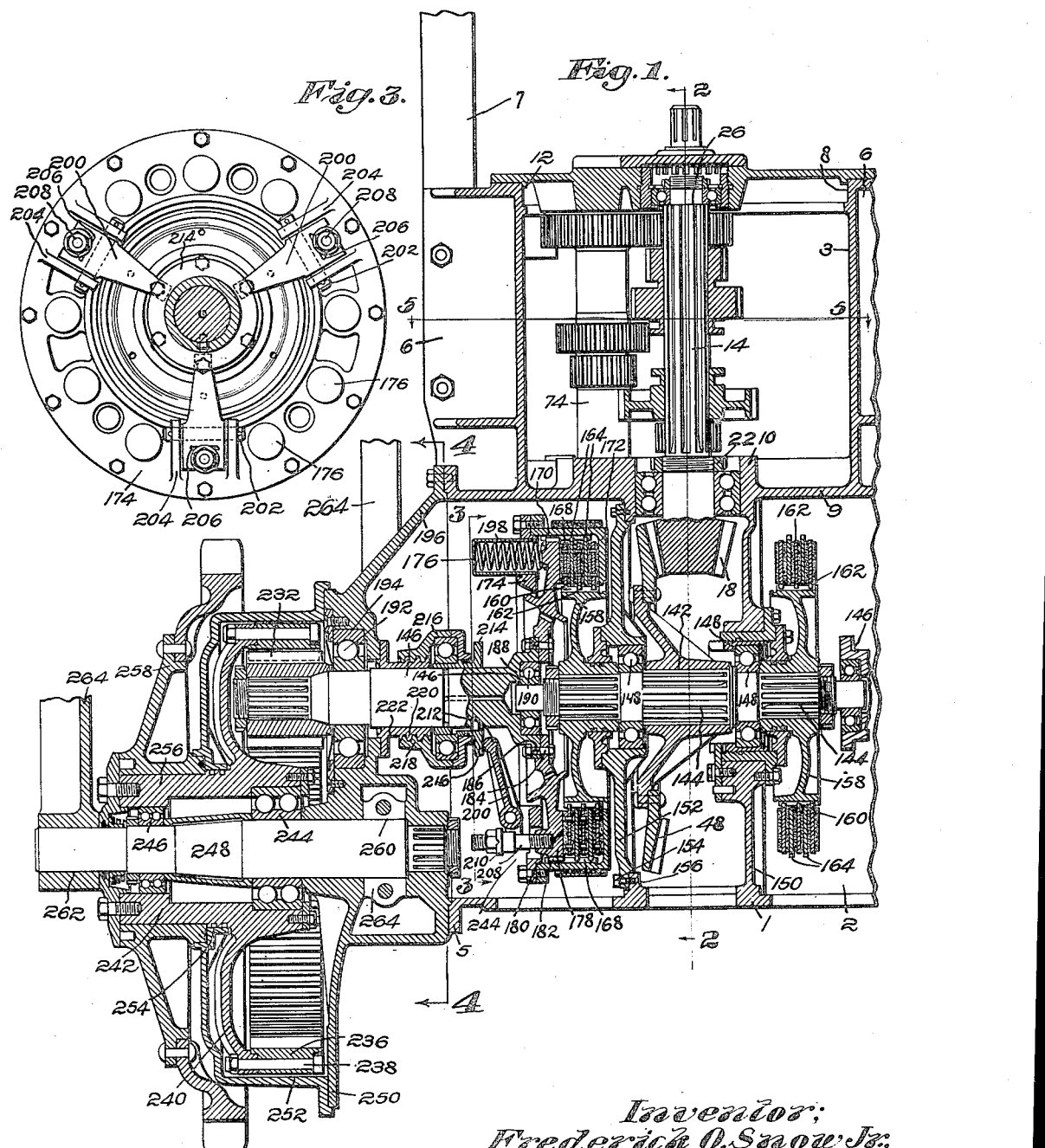

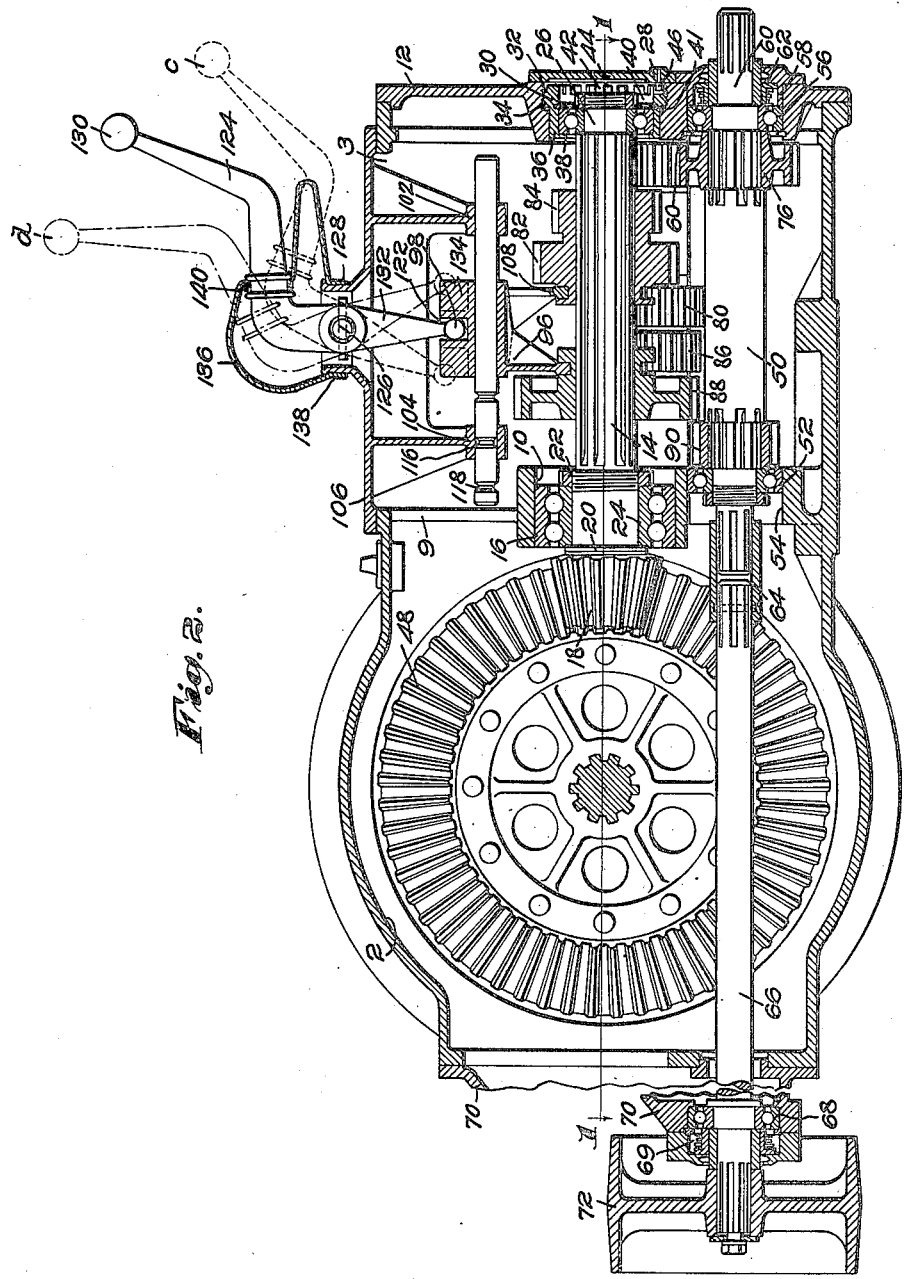

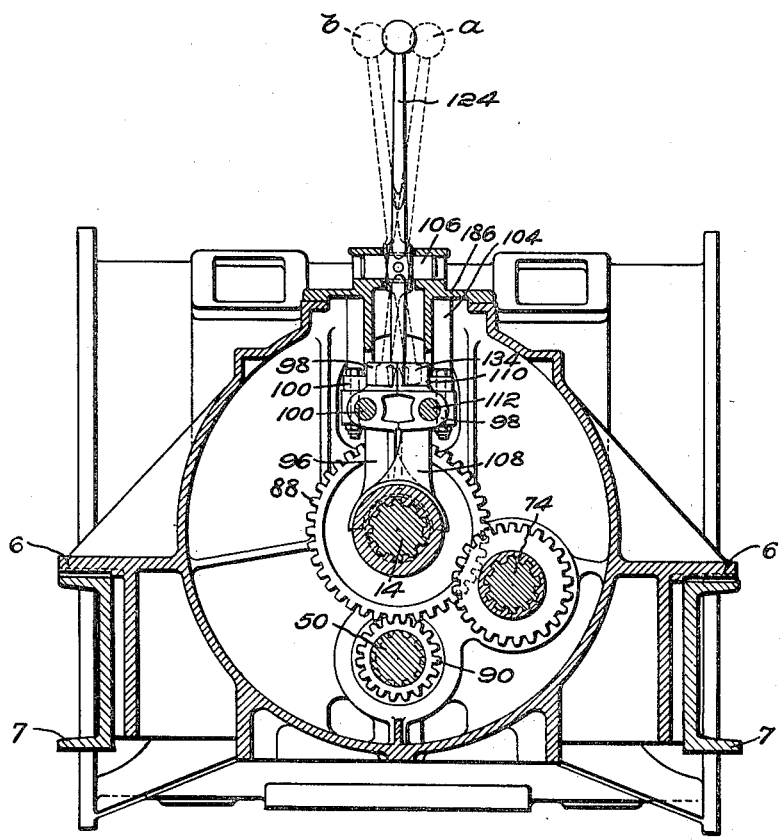

Aug. 9, 1932.  F. O. SNOW, JR  1,870,969
TRACTOR
Filed Aug. 16, 1928  5 Sheets-Sheet 5
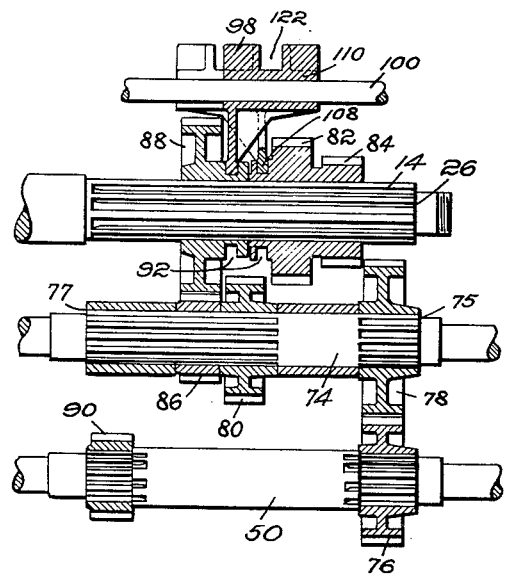
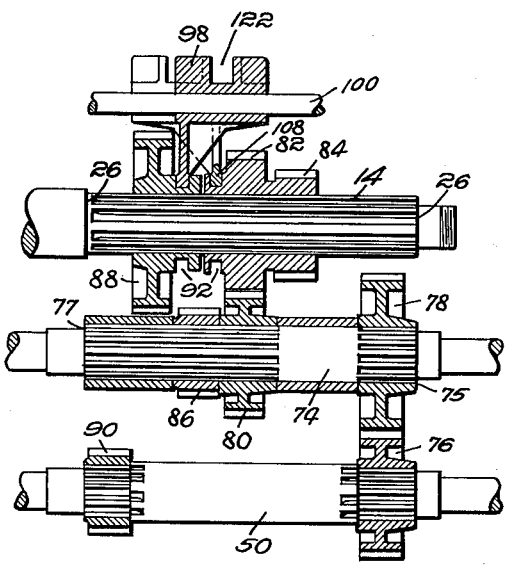
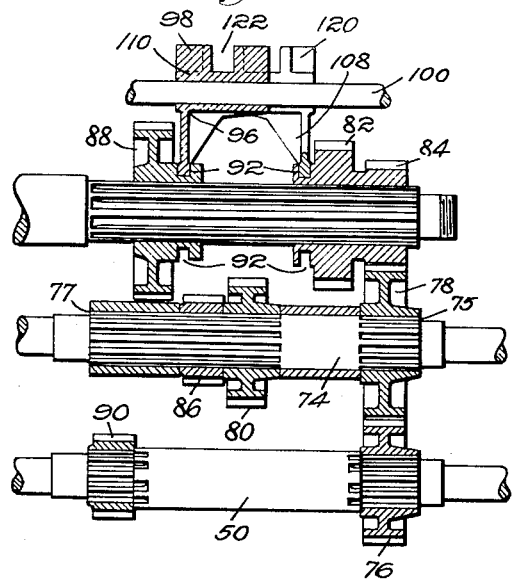
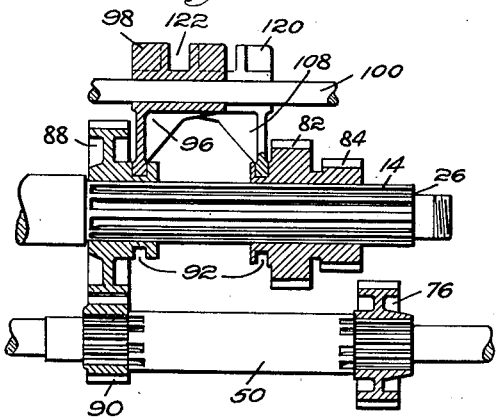
Inventor:
Frederick O. Snow Jr.,
by Emery, Booth, Janney & Varney
Attys.

Patented Aug. 9, 1932

1,870,969

UNITED STATES PATENT OFFICE

FREDERICK O. SNOW, JR., OF WINCHESTER, MASSACHUSETTS, ASSIGNOR TO MEAD-MORRISON MANUFACTURING COMPANY, OF EAST BOSTON, MASSACHUSETTS, A CORPORATION OF MAINE

TRACTOR

Application filed August 16, 1928. Serial No. 300,111.

This invention aims to provide an improved tractor of simple and durable construction.

In the accompanying drawings, I have shown merely for illustrative purposes, one embodiment of my invention wherein:

Fig. 1 is a horizontal section through the rear power transmitting instrumentalities of the tractor, certain parts whereof are broken away to save space in the drawings;

Fig. 2 is a vertical section on the line 2—2 of Fig. 1;

Fig. 3 is a vertical detail section on the line 3—3 of Fig. 1, showing a steering clutch in elevation;

Fig. 4 is a section on the line 4—4 of Fig. 1, showing a portion of one of the traction frames and its supporting and driving instrumentalities;

Fig. 5 is a transverse section through the transmission mechanism taken on the line 5—5 of Fig. 1; and Figs. 6 to 9 inclusive are diagrammatic views of the change speed gearing showing the positions of the various gears for low, second, high and reverse drives respectively.

The particularly embodiment of this invention selected for purposes of illustration and shown in the drawings has to do principally with the transmission and rear axle construction of a tractor, and comprises a housing 1 desirably a casting which includes a cylindrical casing 2 arranged transversely of the tractor and desirably formed integral with a second cylindrical casing 3 which extends forwardly from the casing 2 with its axis arranged to intersect the axis of said casing 2. The casing 2 is open at opposite ends at 4, which open ends are surrounded by flanges 5.

On opposite sides of the cylindrical casing 3 ledges or feet 6 are provided for resting upon, and being secured to, rearwardly extending side members 7 of the main frame thereby providing a rigid tractor frame, the rear portion of which is composed of the housing 1. The casing 3 has an open forward end 8 while the rear end thereof is separated from the interior of the casing 2 by a partition 9, having a central opening 10 providing communication between the two casings 2 and 3. The forward opening 8 of said casing 3 is provided with a cover plate 12 detachably secured to said casing so that it may be removed to provide free access to the interior of the said transmission casing and gearing contained therein.

Arranged within the casing 3 and with its axis approximately coincident with the axis of the cylindrical portion of said casing 3 is a driving shaft 14, the rear end of which is journalled to rotate in a bearing unit 16 arranged for movement axially of the said shaft 14 in the opening 10. A bevel pinion 18 is attached to or integral with the end of the shaft 14 which protrudes through the bearing 16 into the interior of the casing 2, and between said pinion and the said bearing unit is a shoulder 20. (See Fig. 2). Upon the opposite side of said bearing unit from said shoulder is a collar 22 having screw-threaded engagement with said shaft 14 to maintain the inner race 24 of said bearing unit in contact with the shoulder 20. The shaft 14 is shouldered at 26, and seated against this shoulder is a bearing unit 28 carried by a ring 30, arranged for adjustment in the cover 12, axially of said shaft 14 by means of screw threads 32 formed exteriorly of said ring and engaging corresponding threads 34 in the opening 36 of said cover. The ring 30 has an inner lip 38 to engage one face of the outer race of the bearing unit 28, and a removable split ring 40 fitted into a groove 41 engages the outer face of said bearing race to position the bearing unit axially in the ring and insures said bearing unit moving with the ring when the latter is adjusted one way or the other through the opening in said plate. The outer end of the ring 30 is notched at 42 for engagement by a spanner wrench, whereby said ring may be turned and adjusted. A cap 44 secured over the outer end of the opening 36, and carried by said cap is a pin 46 which when said cap is secured in place projects into one of the notches 42 in said adjustable ring and prevents movement of said ring after the desired adjustment has been made. By means of the foregoing adjustments, the shaft 14 may be moved axially to properly position the teeth of the pinion 18 with respect to the teeth of a driven bevel gear 48 arranged in the housing 2, and hereinafter more fully described, or by reason of the fact that the central opening 10, within which is fitted the bearing unit 16, is made slightly larger in diameter than the outside diameter of the bevel pinion 18, said shaft 14 and said pinion together with the sliding gears upon said shaft being withdrawn bodily from the gear casing 3 and out of mesh with the bevel gear 48 without disturbing the latter. The bearing unit 16 is arranged to be withdrawn bodily with said shaft 14 and said pinion, through the opening formed by the detaching of the plate 12, thereby permitting quick replacement of the pinion 18.

Beneath the shaft 14 and also journalled to rotate in the transmission casing 3 is a transmission shaft 50 supported at its inner end by a bearing unit 52 adjustable axially of said shaft in an opening 54 in the partition 9. The forward end of said shaft 50 is supported in a bearing unit 56 arranged in an opening 58 formed in the cover 12.

The shaft 50 has a reduced end 60 protruding through an oil tight cup 62 and constitutes the driven end of said transmission shaft, receiving its power from the power unit of the tractor in any suitable or appropriate manner, not shown. The rear end of said shaft 50 also protrudes through the partition 9, and is coupled by means of a coupling 64 with a power shaft 66 extending through to the rear of the casing 2 where it is journalled to rotate in a bearing 68 carried in a detachable bracket or cover plate 70.

The rear end of the shaft 66 protrudes through the bearing 68, also an oil retainer 69, and has secured thereto a power pulley 72 whereby power may be provided for serving various purposes.

To one side of the plane of the driving and transmission shafts 14 and 50 is a counter shaft 74, suitably journalled at opposite ends in bearings carried by the partition 9 and the cover plate 12 respectively. Axial movement of said counter shaft in said casing 3 is prevented by shoulders 75 and 77. Keyed to the shaft 50 is a driving gear 76 arranged to mesh continuously with an intermediate gear 78 suitably keyed or otherwise secured to the counter shaft 74, whereby motion is imparted to said counter shaft. A second gear 80 is secured to the counter shaft 74 in spaced relation to the gear 76, and is of slightly smaller diameter than the gear 78.

Splined to the shaft 14 is a pair of gears 82 and 84 integrally connected and arranged to slide in unison between the gears 78 and 80 of the shaft 74. The gear 82 is arranged to mesh with the gear 80, whereas the gear 84 meshes only with the gear 78, and movement of the two gears 82 and 84 along said shaft 14 will effect the intermeshing thereof respectively with said gears 80 and 78. The gear 84 when in mesh with the gear 78, as shown in Fig. 8, produces a train of gears for transmitting high speed directly from the transmission shaft 50 to the driving shaft 14. It will be apparent from the foregoing that when the gear 84 is in mesh with the gear 78, the gear 82 will be disengaged from its gear 80, and likewise when the gear 82 is in mesh with its gear 80, the gear 84 will be disengaged from its associate gear 78, so that there will be no locking of gears.

The gears 82 and 80 when in mesh as shown in Fig. 7, being of a different ratio from the gears 84 and 78, transmit a different speed, herein second speed, from the transmission shaft 50 through the shaft 74 to the shaft 14.

Also secured to the shaft 74 is a third gear 86 of smaller diameter than either of the gears 80 and 78. This gear is arranged to mesh at the proper time with a third gear 88 splined to the driving shaft 14, and as the gear 88 is of much larger diameter than the second speed gear 82 when the gear 88 is in mesh with the gear 86 a much slower motion will be imparted to the shaft 14 and this train of gears constitutes the low speed train to the shaft 14.

Also keyed to the transmission shaft 50 is a relatively small pinion 90 of suitable diameter to engage the teeth of said sliding gear 88 carried by the shaft 14. The pinion 90, however, is spaced far enough from the gear 86 to permit the gear 88 when at rest between said gears 86 and 90 to be free of both and hence inoperative, but upon movement of said gear 88 farther along the shaft 14 said gear will be brought into mesh with said gear 90 as shown in Fig. 9, whereby the shaft 14 operated directly through the gears 88 and 90 will be driven in a reverse direction to that imparted through either of the other trains described.

The sliding gear unit composed of the gears 82 and 84 and the unit composed of the gear 88 are arranged to be moved longitudinally of the driving shaft 14 by any appropriate gear shifting instrumentalities, and to facilitate this shifting, each of said units is provided with a grooved collar 92. Engaging the groove 92 of the gear unit composed of the gear 88 is a yoke 96 depending from a slide member 98 including a rod 100, said rod being slidably mounted in lugs 102 and 104 depending from a cover plate 106 of the transmission casing 3. The groove 92 of the gears 82 and 84 is engaged by a similar yoke 108 depending from a slide member 110 carried by a rod 112 also slidable in said lugs 102 and 104. The positions of the shifting gears are determined by suitable spaced grooves 114, 116 and 118 shown most clearly in Fig. 2, which are engaged at the proper time by resilient detents of well-known form, not shown in the drawings, thus yieldingly holding said yokes and the gears engaged thereby in position for high, second, low and reverse drives. When the gear 88 occupies the positions shown in Figs. 7 and 8, it will be in neutral position, and free from engagement with any of its cooperating gears, likewise when the gear unit comprising the gears 82 and 83 is in the positions shown in Figs. 6 and 9, said gears 82 and 84 will be in their neutral positions and out of mesh with any of their cooperative gears, and when both of the shiftable gear units are in their neutral positions, no motion will be transmitted from the transmission shaft 50 to the driving shaft 14, and the tractor will remain at a standstill.

The slides 98 and 110 have upwardly extending portions 120 provided with transverse notches 122 adapted to align one with the other when the shiftable gears are in neutral position. Means operative from the exterior of the casing 3 are provided for shifting the yokes 96 and 108 to change the alignment of the gears of the several speed gear trains, said means herein consisting of a gear shift lever 124 which is universally pivoted upon a stud 126 within a constricted portion 128 of said cover 106. The upper end of the lever 124 has a ball-like handle 130, while extending below the pivot 126 is an arm 132 also having a ball-like end 134 adapted to fit the notches 122.

The lever 124 is substantially universally pivoted upon said stud 126 so that it may be rocked sidewise as shown in dotted lines in Fig. 5 to move the ball end 134 from the notch 122 of one of said slides into the notch 122 of an adjacent slide, said lever being also rockable to the right or left as in dotted lines, Fig. 2, within which dotted positions the ball end 134 will either be within the notch of the slide 98 or within the notch of the slide 110, but the last mentioned movement can never take place when the said lever is in the full line position of Fig. 5 which is the neutral position thereof.

With the lever 124 in the dotted position *a* (Fig. 5) the ball end 134 thereof will be located wholly within the notch 122 of the slide 98, and free to move fore and aft of the tractor and if so moved to the dotted position *c* of Fig. 2, the yoke 96 will cause the gear 88 to move into alignment to mesh with the gear 86, as shown in Fig. 6 of the drawings, whereby the driving shaft 14 will be operated at low speed to start the vehicle. Or, if while the lever 124 is in the position *b* (Fig. 5) it is pushed forward first to the full line position of Fig. 2 returning the gear 88 to its neutral position of Fig. 6, and thence into the position *b* throwing the gearing into second speed, the lever 124 being first moved from neutral position of Fig. 5 into the position *b* of said figure so that the lower end 134 of said lever will engage solely the notch of the slide 110. Thus, upon movement of said shifting lever into position *c*, Fig. 2, the gear 82 will be moved into alignment and mesh with the teeth of the gear 80. (See Fig. 7.) For high speed the rocking of said lever 124 to position *d* of Fig. 2, will cause the gear 84 to mesh with its gear 78.

To shift to reverse gear, the lever 124 must first be moved back to neutral, and then to position *a*, Fig. 5, and thence to the position *c* in Fig. 2, moving the gear 88 into alignment and meshing with the teeth of the gear 90 on the transmission shaft 50. To prevent dust and dirt from getting into the gear case 3 through the restricted part 128 of said casing, a flexible boot 136 is bound around the restricted portion of said housing at 138, while the upper end thereof is securely bound at 140 to the movable gear shift lever 124.

Arranged transversely of the housing 2 is a jack shaft 142 desirably formed in three sections, a middle or central section 144 and end sections 146. The central section 144 is journalled to rotate in bearing units 148 mounted respectively in the fore and aft partitions 150 and 152 within said housing 2. One of said partitions, herein the partition 152, is detachably secured by screws 154 to an internal flange 156, said last mentioned partition 152 being removable to provide access to the space between said partitions, wherein is located a driven gear 48, the latter being keyed securely to the central portion 144 of the jack shaft. This central portion protrudes beyond the partitions 150 and 152 and secured to said protruding ends are driven clutch members 158 of steering clutches. Each driven member 158 is provided with a series of longitudinal ribs 160 arranged to engage clutch rings 162 of said steering clutches, to cause said rings to move with the driven members 158. Alternating with the clutch rings 162 are driven clutch rings 164, the latter being keyed to ribs 168 formed upon the interior of a cylindrical flange 170 constituting the rim of a floating clutch ring, the latter being provided at one end with an annular inturned rim 172, which engages the outermost clutch ring of the series including the rings 162 and 164. At the opposite end of the cylindrical rim 170 is an inturned flange 174 which is recessed to receive a series of cup shaped spring containers 176, said flanges 172 and 174 lying adjacent opposite ends of said series of clutch rings. Interposed between the flange 174 and said clutch rings is a pressure ring 178 having one face 180 engaging the adjacent end ring of the series of clutch rings in opposed relation to the flange 172.

The outer periphery of the pressure ring 178 is notched at 182 to engage the ribs 168 upon the inner cylindrical portion of said floating ring so as to cause said ring and said pressure ring to move in unison. The pressure ring 178 extends inwardly toward the axis of the jack shaft and is detachably secured by bolts 184 to an annular flange 186 formed at the end of the driven or end portion 146 of the jack shaft. The inner ends of said driven shaft sections 146 are recessed at 188 to receive bearing units 190 which provide supports for the inner ends of said sections 146 upon the protruding ends of the central shaft portion 144, thereby insuring perfect alignment of the several shaft sections. The outer ends of the shaft sections 146 are journalled to rotate in suitable bearing units 192, arranged within recesses 194 formed in end closure members 196 of the housing 2, herein secured to the annular flange 5 of said housing section.

Clutch springs 198 are contained in the spring casings 176 each bearing at one end against the closed end of said casing, and at its opposite end against the outer side of the pressure ring 178, a number of said springs being employed to evenly distribute the pressure circumferentially upon the clutch rings to maintain the same in driving relation. To release the pressure of said springs against said pressure ring, I herein provide a plurality of clutch throw-out levers 200, (see Fig. 3), which are pivoted at 202 between ears 204 projecting laterally from the flange 174. The levers 200 are radially arranged, their outer ends being forked at 206 to straddle studs 208 carried by the pressure ring 178 and extending through openings in said pressure ring, and through the forked ends of said levers. An adjustable collar 210 is provided on each of said studs whereby the relation of said collar to the forked ends of said levers may be varied. The inner ends of the levers 200 are cylindrically shaped at 212, and all engage one face of a shifting collar 214 encircling the shaft 146. Means are provided for simultaneously shifting or rocking the clutch levers 200 to release the clutches for steering the vehicle, said means including a collar 216 provided with screw threads 218 arranged to engage corresponding screw threads 220 upon a stationary sleeve 222, the latter being secured to the closure member 196. (See particularly Fig. 1.) When it is desired to release one steering clutch or the other, a rotary movement is imparted to the collar 216 by means of a rod 224, Fig. 4, extending into the enclosure 196 through a suitable opening 226, and is pivotally connected at 228 to an eye 230 extending laterally from said collar 216. The rocking of said collar by the rod 224 causes through the screw threads 218 and 220 an axial movement of the collar 214 to rock said levers 200, and thus remove the pressure of the springs from the clutch rings.

Each end section 146 of the jack shaft extends beyond the bearing unit 192 and has secured to the protruding end thereof a pinion 232 which is arranged to engage the teeth 234 of an internal gear ring 236. (See Figs. 1 and 4.)

The gear ring 236 is secured by a circular series of bolts 238 to the outer periphery of a flange 240 carried by a hub 242 journalled upon inner and outer bearing units 244 and 246 respectively, supported upon a lateral stud 248.

The stud 248 is eccentrically mounted relatively to the jack shaft 146 in the enclosure member 196 centrally of a circular flange 250. A gear casing 252 is secured to the rim of the flange 250 completely enclosing the disk 240 and its internal gearing 246, said housing 252 having oil tight bearing engagement at 254 with the hub 242 which protrudes from said housing at 256, and has detachably secured thereon a sprocket gear 258. The stud 248 has an inner bearing surface 260 and an outer bearing surface 262 for pivotally supporting the side members 264 of the traction members which support the propelling means for the tractor.

The invention is not limited to the specific embodiment herein shown.

I claim

1. In a tractor, in combination, a transmission shaft, a driving shaft, a counter shaft, a high speed gear secured to said transmission shaft, a second high speed gear secured upon said counter shaft in continuously meshing engagement with said high speed gear, a second speed gear secured on said counter shaft, a low speed gear also secured on said counter shaft, a slidable gear unit splined to said driving shaft and including a gear to mesh with the high speed gear of said counter shaft, said unit also including a gear to mesh with the second speed gear of said counter shaft, a reverse pinion fast upon said transmission shaft, a second sliding gear unit slidable on said driving shaft into mesh either with the low speed gear on said counter shaft or the reverse gear on said transmission shaft, and shifting means to complete one or the other of the trains of gears and to lock the other gears in unmeshed relation.

2. A change speed transmission comprising three parallel shafts supported at their ends and comprising a transmission or power shaft, a driving or work shaft and a countershaft, one of the first two and the countershaft having constantly meshing pinions, said one shaft also having a reversing pinion fast thereon, gears on the countershaft and shiftable gears on the other of said first two shafts for selective engagement with said gears on the countershaft and with said reversing pinion.

3. A change speed transmission comprising three parallel shafts supported at their ends and comprising a transmission or power shaft, a driving or work shaft and a countershaft, means organized between the shaft bearings directly driving the countershaft from the power shaft and relatively shiftable gears organized between the shaft bearings and providing for a direct connection between said power and work shafts and for connections of different speed ratios between them through the countershaft.

In testimony whereof, I have signed my name to this specification.

FREDERICK O. SNOW, JR.